Patented Oct. 1, 1935

2,016,265

UNITED STATES PATENT OFFICE 2,016,265

CLEANING COMPOSITION

Wilfred T. Doherty, Houston, Tex., assignor to Standard Oil Development Company, a corporation of Delaware No Drawing. Application April 9, 1932, Serial No. 604,351

3 Claims. (Cl. 87—5)

This invention relates to improvements in cleaning compositions, especially adapted for cleaning oily surfaces. In its preferred form the invention comprises an aqueous solution of a composition of partly purified acid sludge recovered from the treatment of petroleum with concentrated sulphuric acid and mixed with alkalies such as sodium hydroxide, sodium carbonate, tri-sodium phosphate, etc.

There is formed by the treatment of petroleum oils, such as lubricating oils, with large quantities of concentrated sulphuric acid, an acid or group of acids and other materials which separate out in an acid sludge layer. The sludge layer is partly purified by separately removing the oil and sulphuric acid.

The sludge is first washed with a medium heavy petroleum distillate and after agitation and stratification, the oil layer is drawn off carrying with it a considerable portion of the oil. The remaining sludge is diluted with water sufficient to form two layers after agitation with steam. The mixture after being thoroughly agitated with steam is allowed to settle and the water layer containing the major portion of the sulphuric acid present in the sludge is removed. The residual sludge layer is extracted with naphtha for removal of the remaining fraction of oil.

The separate sludge layer containing sludge acids and other materials is now suitable for use in my compositions according to the following formula:

| | Per cent |
|---|---|
| Partly purified sludge (20 to 35% sludge acids) | 50 |
| Sodium hydroxide | 15 to 17 |
| Sodium carbonate | 13 to 15 |

The amount of alkali is sufficient to neutralize all or most of the sludge acids. They should be always neutralized to a substantial extent but some free acidity is not objectionable.

This composition is dissolved in hot or cold water in the proportions of 10 ounces, or about ½ pint to a gallon of water may be used as follows:

For cleaning surfaces; by wetting the surface to be cleaned with the prepared solution, allowing to stand or soak for about ten minutes, then scrubbing or rubbing with a brush and rinsing off with clean water.

For cleaning oily rags, etc.; heating the prepared solution and soaking the oily rags in the hot solution for several hours, then rinsing out with clear water.

For removing paint; by preparing a 25 to 75% water solution of the composition and jetting with steam onto paint to be removed and rinsing off with clean water.

For opening drain pipes and traps; 15 ounces of the composition is dissolved in one gallon of water, heated and poured into the drain pipe.

For reclamation work; use steel vats large enough to receive the material to be cleaned. The steel vats should be so constructed that heat may be applied. The temperature of 180° to 200° F. gives the best results. A pulley may be placed above the vat to raise and lower the equipment to be cleaned. Allow the equipment to remain in the hot solution approximately two hours. Remove and rinse with clear water. This will put the equipment in shape to be easily worked over.

Alternate forms of cleaning compositions are prepared in which purified acid sludges neutralized with sodium or potassium hydroxide and having sodium or potassium hydroxide in excess up to 10%, are used as bases according to the following:

| Bases | Pine oil | Trisodium phosphate | Water | Total volume |
|---|---|---|---|---|
| Pounds | Gallons | Pounds | Gallons | Gallons |
| 250 | 5 | 2.2 | 95 | 125 |
| 250 | 5 | 5.0 | 95 | 125 |
| 250 | 5 | 12.0 | 80 | 110 |
| 250 | 10 | 22.0 | 85 | 120 |
| 250 | 15 | 26.0 | 85 | 125 |

The compositions are suitable for cleaning surfaces. Paints are readily removed when the compositions are suitably applied, as with a jet of steam. Greases are readily removed. The compositions are especially adapted for cleaning garage floors and driveways, especially where it is desired to remove oil from concrete, or composition floors, etc.

The foregoing description is merely illustrative and various changes and alternative arrangements may be made within the scope of the appended claims in which it is my intention to claim all novelty inherent in the invention as broadly as the prior art permits.

I claim:

1. A method of preparing a cleaning composition which comprises a sludge separated from concentrated sulfuric acid treatment of petroleum oils and purified by separately treating the sludge with petroleum distillates to substantially remove oil, by separately treating the residual sludge with water and steam to substantially remove all the sulfuric acid, by separately treating the residual sludge with naphtha to remove the remaining fraction of oil and adding to the residual sludge sodium hydroxide in excess, pine oil, trisodium phosphate and water.

2. A method of preparing a cleaning composition, which comprises treating petroleum oils with concentrated sulfuric acid, separating the sludge layer, treating the sludge layer with medium heavy oil distillate and removing the oil layer, treating the residual sludge layer with water and steam and removing the acid water layer, treating the residual sludge layer with naphtha and removing the naphtha layer and adding to 50% of the partly purified sludge 15 to 17% of an alkali metal hydroxide and 13 to 15% of an alkali metal carbonate.

3. Method according to claim 2 in which the alkali metal hydroxide is sodium hydroxide and the alkali metal carbonate is sodium carbonate.

WILFRED T. DOHERTY.